(12) United States Patent
Skiba

(10) Patent No.: US 6,471,455 B2
(45) Date of Patent: Oct. 29, 2002

(54) HOLD-DOWN DEVICE FOR PICK-UP TRUCK CARGO BEDS

(76) Inventor: Mark L Skiba, 1066 Pine Rd., Alpena, MI (US) 49707

( * ) Notice: Subject to any disclaimer, the term of this patent is extended or adjusted under 35 U.S.C. 154(b) by 0 days.

(21) Appl. No.: 09/791,403

(22) Filed: Feb. 23, 2001

(65) Prior Publication Data

US 2001/0043844 A1 Nov. 22, 2001

Related U.S. Application Data

(62) Division of application No. 09/425,520, filed on Oct. 22, 1999, now Pat. No. 6,193,452.
(60) Provisional application No. 60/105,355, filed on Oct. 23, 1998.

(51) Int. Cl.[7] .................................................. B60P 7/08
(52) U.S. Cl. ............................ 410/38; 410/32; 410/34; 410/35; 410/143
(58) Field of Search .............................. 410/32, 34, 35, 410/38, 150, 151, 140–143, 129; 248/231.1, 316.1, 500; 206/451; 224/403, 536, 42.38, 558, 570

(56) References Cited

U.S. PATENT DOCUMENTS

| | | | | |
|---|---|---|---|---|
| 7,575 A | * | 8/1850 | Drake | 410/32 |
| 710,639 A | * | 10/1902 | Vickers | 410/38 |
| 2,855,217 A | * | 10/1958 | Bagwell | 410/32 |
| 3,893,568 A | * | 7/1975 | Lile | |
| 4,121,849 A | * | 10/1978 | Christopher | 410/38 |
| 5,028,184 A | * | 7/1991 | Krause | 410/143 |
| 5,338,136 A | * | 8/1994 | Hetchler | 410/100 |
| 5,971,685 A | * | 10/1999 | Owens | 410/151 |
| 6,062,780 A | * | 5/2000 | Petelka | 410/89 |
| 6,168,359 B1 | * | 1/2001 | Smith | 410/38 |
| 6,193,452 B1 | * | 2/2001 | Skiba | 410/38 |

* cited by examiner

Primary Examiner—Stephen T. Gordon
(74) Attorney, Agent, or Firm—James M. Deimen

(57) ABSTRACT

A new hold-down or retention device comprises a pair of vertical standards bolted or otherwise attached to the cargo bed of a pick-up truck. Preferably, the standards are located near to the cab end of the cargo bed but spaced therefrom. A cross-member is adjustably attached to the standards and extends therebetween. By placing one end of a long object such as a ladder or scaffold plank under the cross-member and adjusting the cross-member down to retain the object to the bed, the object is easily tightly retained to the truck cargo bed even when the object is three or more times the length of the cargo bed.

3 Claims, 2 Drawing Sheets

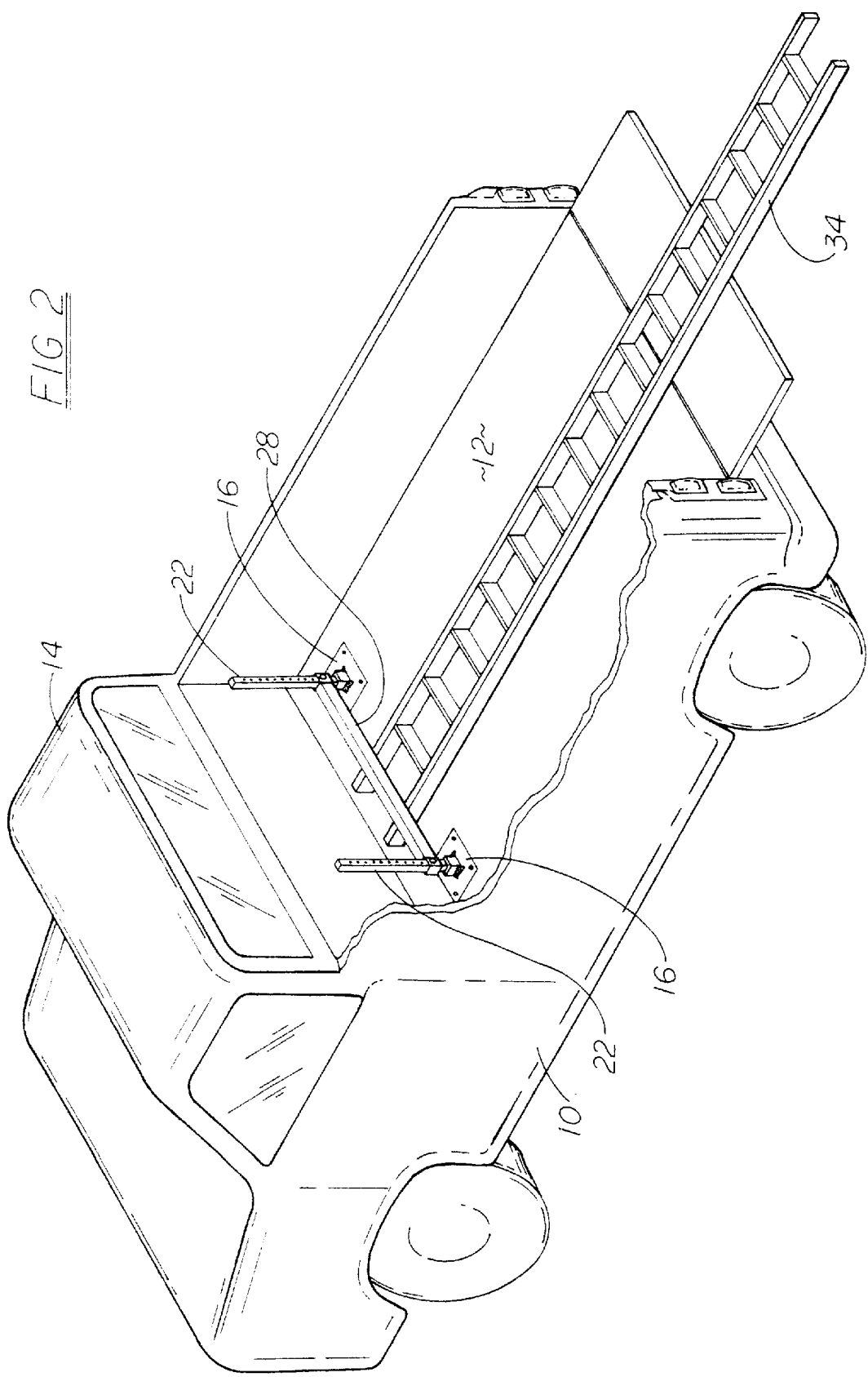

HOLD-DOWN DEVICE FOR PICK-UP TRUCK CARGO BEDS

This application is a division of application No. 09/425,520 filed Oct. 22, 1999, in turn claiming the benefit of provisional patent application 60/105,355 filed Oct. 23,1998, now U.S. Pat. No. 6,193,452.

BACKGROUND OF THE INVENTION

This application is a complete application based on provisional application No. 60/105,355, filed Oct. 23, 1998.

The field of the invention pertains to pick-up trucks and the retention of cargo placed in the cargo bed. In particular, the invention pertains to devices for retaining cargo in the cargo bed where the cargo is much longer than the length the cargo bed.

Frequently it is necessary to carry lengthy ladders, pipe, lumber, plastic siding and other construction materials that are typically two to four times the length of the cargo bed of the pick-up truck, even with the tailgate down. In such cases, the cargo is typically tied down with rope and weighted with cement blocks or other heavy objects. Such methods of retaining the cargo are inconvenient, time consuming and potentially very unsafe in the event the cargo drops from the truck to the highway.

A variety of devices have been used to retain a cargo in a truck. One example is the device shown in U.S. Pat. No. 4,702,653 wherein horizontal bars are mounted on horizontal tracks to retain stacks of boxes in position inside the truck. U.S. Pat. No. 5,028,184 discloses a horizontal bar positionable vertically on cut-to-fit wooden posts, the wooden posts in turn positionable on vertical tracks formed in the truck sidewalls.

Cargo bed liners for pickup trucks have been modified to retain items in cargo beds such as the cargo beds disclosed in U.S. Pat. No. 4,887,947 and U.S. Pat. No. 4,958,876. These bed liners, however, only retain items with partitions within the bed to prevent sliding around in the bed. There are no features directed to retaining long objects that extend well beyond the bed.

SUMMARY OF THE INVENTION

The new hold-down device comprises a pair of vertical standards bolted or otherwise attached to the cargo bed of the pickup truck. Preferably, the standards are near to the cab end of the cargo bed but spaced therefrom. A cross-member is adjustably attached to the standards and extends therebetween. By placing one end of a long object such as a ladder or scaffold plank under the cross member and adjusting the cross member down to retain the object to the bed the object is easily tightly retained to the truck cargo bed even when the object is three or more times the length of the cargo bed.

BRIEF DESCRIPTION OF THE DRAWINGS

FIG. 2 is a partial perspective cut-away view of a pick-up truck and hold-down device employed to retain a ladder.

BRIEF DESCRIPTION OF THE PREFERRED EMBODIMENT

Figure 1:
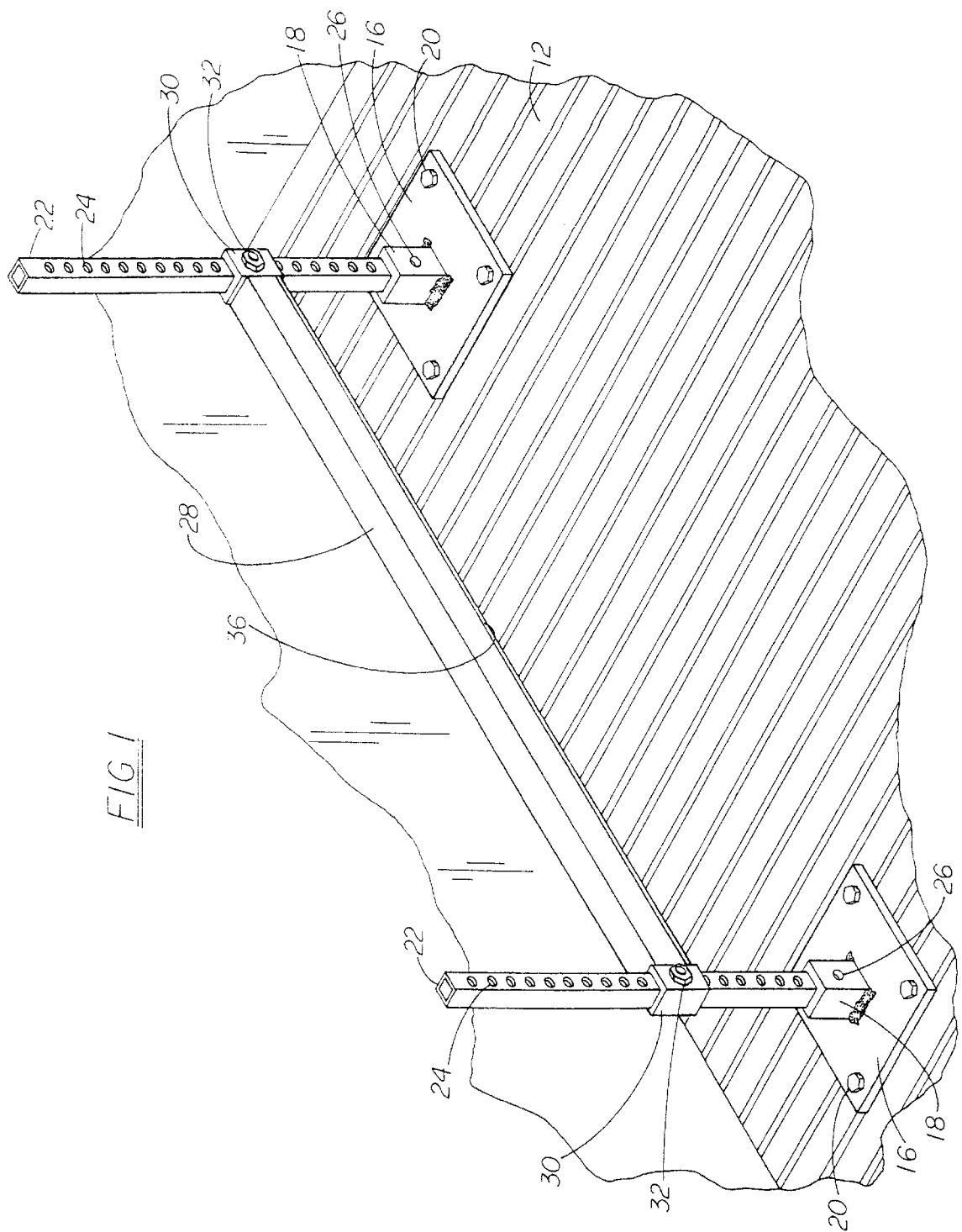
FIG. 1 is a partial perspective cut-away view of the hold-down device attached to a cargo bed.

Illustrated in FIGS. 1 and 2 is a pick-up truck 10 having a cargo bed 12 and a cab 14. Adjacent but spaced from the cab end of the cargo bed 12 are a pair of plates 16 having a pair of short square tubes 18 each welded to a plate. The plates 16 are shown bolted 20 to the cargo bed 12, however, any suitable fastening means may be substituted.

Vertically inserted into each square tube 18 is a vertical standard 22 having a plurality of holes 24 therethrough including a lower most hole that aligns with a hole 26 through each square tube 18. A clevis pin and bolt or other device my be used through each hole 26 to retain each standard 22 in each square tube 18 or, in the alternative each standard may be welded to the corresponding square tube.

A square tube horizontal cross-member 28 has a square tube vertical member 30 welded to each end. The square tube vertical members 30 fit over and slide vertically on the vertical standards 22 as shown enabling the horizontal cross-member 28 to slide up and down between the vertical standards.

An ordinary bolt and nut 32 may be used through a hole in each vertical member 30 and selected holes 24 in standard 22 to retain the horizontal cross-member 28 at a selected height above the floor 12 of the pick up truck 10. In this manner, one end of a long object such as the ladder 34 shown may be clamped to the floor 12 of the pick-up truck 10 in a secure manner.

As an option, the surface of the horizontal cross-member may be coated on the underside thereof with a non-slip paint, rubberized coating or a tough foam material 36 to assure that the load cannot slide from under the horizontal cross-member 28.

What is claimed is:

1. A method of retaining long slender cargo multiple times the length of a pick-up truck cargo bed comprising the steps of, placing the cargo between a pair of vertical standards in the cargo bed, positioning a cross-member atop the cargo to retain the cargo against the cargo bed at a location remote from the rear of the truck, and attaching the cross-member to the pair of vertical standards in position atop the cargo to prevent upward motion of the cargo and cross-member.

2. A method of retaining long slender cargo multiple times the length of a pick-up truck cargo bed comprising the steps of, placing a portion of the cargo adjacent at least one vertical standard in the cargo bed, the remainder of the cargo extending beyond the rear of the truck, positioning a rigid cross-member atop the cargo to retain the cargo against the cargo bed at a location remote from the rear of the truck, and attaching the rigid cross-member to the at least one vertical standard in position atop the cargo to prevent upward motion of the cargo and cross-member.

3. The method of retaining long, slender cargo of claim 2, including the step of slidably positioning the cross-member on the at least one vertical standard.

* * * * *